Oct. 10, 1961 — F. L. HAUSHALTER — 3,003,339
RUBBER TORSIONAL UNIT
Filed Nov. 9, 1959 — 2 Sheets-Sheet 1
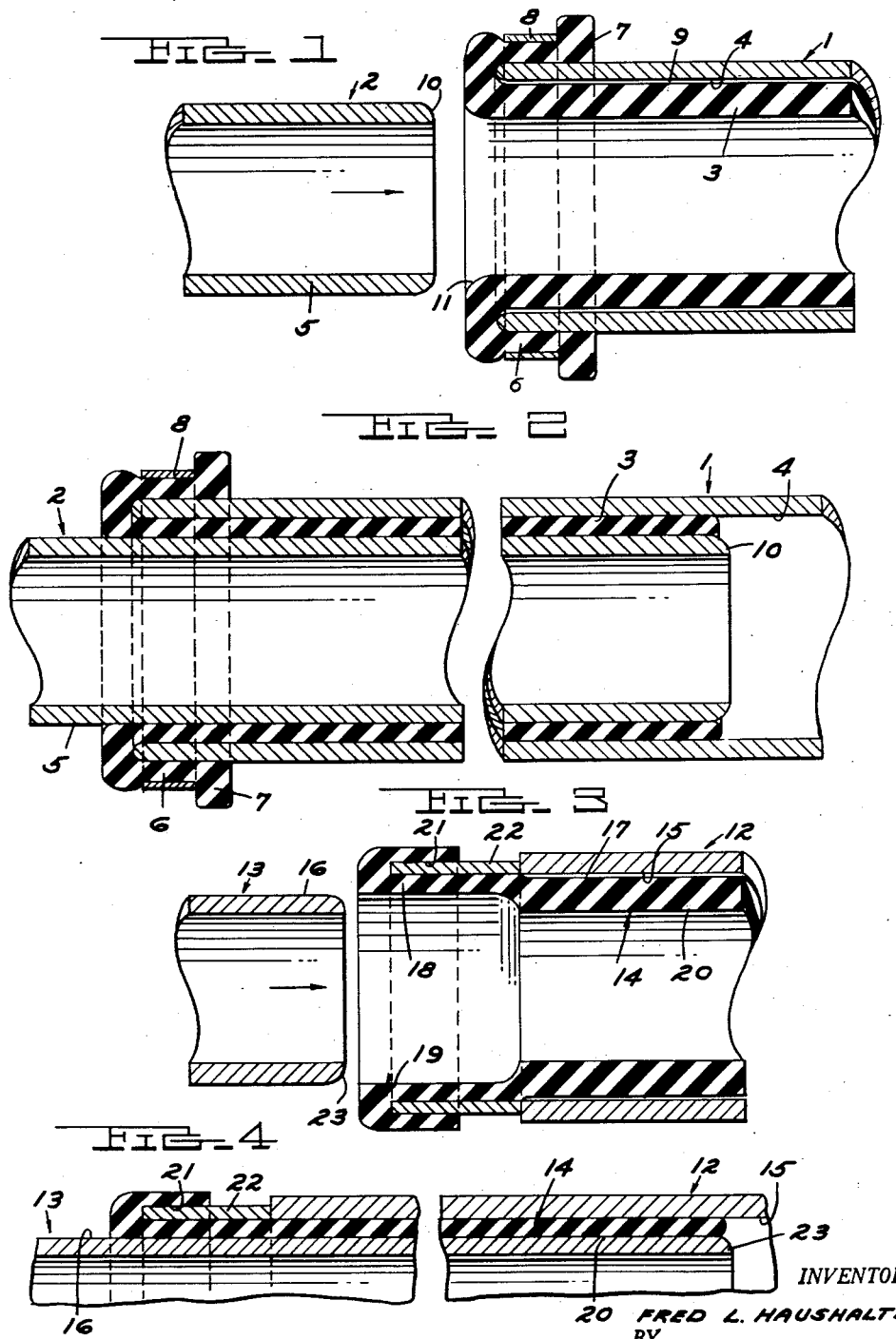
INVENTOR.
FRED L. HAUSHALTER
BY
Whittemore Hulbert & Belknap
ATTORNEYS

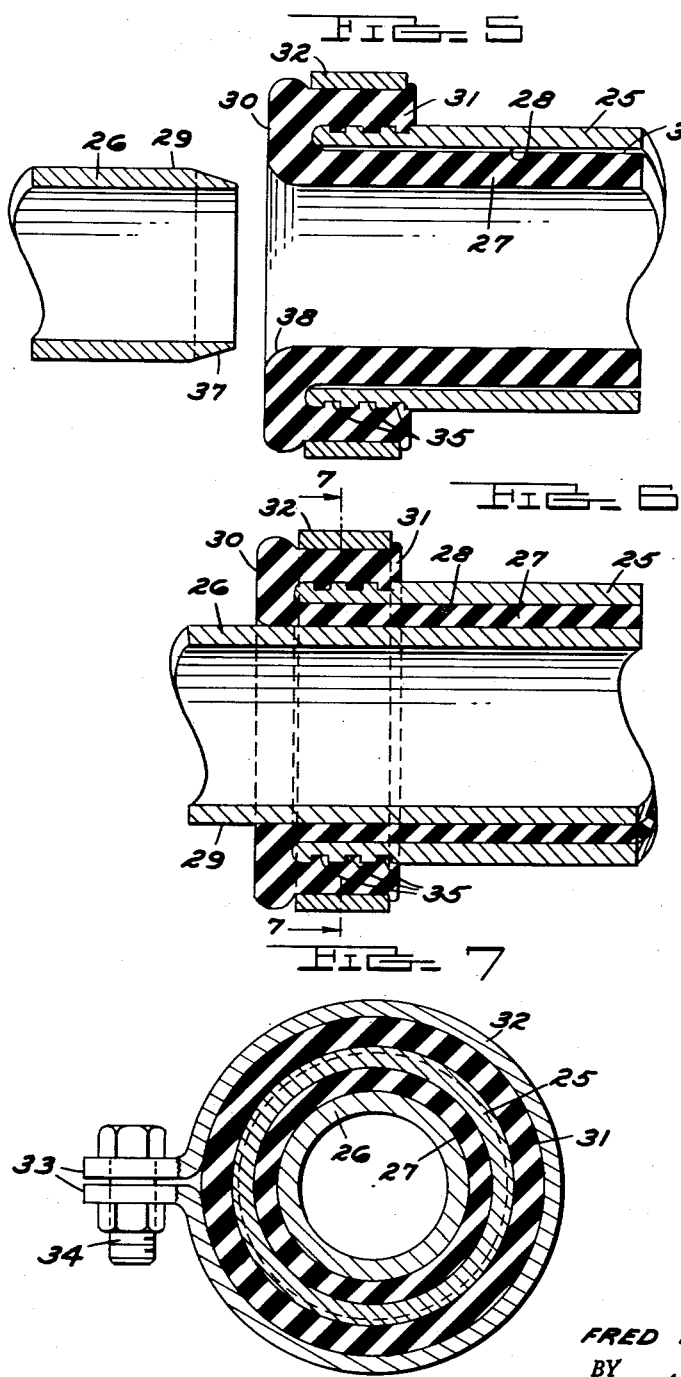

United States Patent Office 3,003,339
Patented Oct. 10, 1961

3,003,339
RUBBER TORSIONAL UNIT
Fred L. Haushalter, 2185 Scott Lake Road, Pontiac, Mich.
Filed Nov. 9, 1959, Ser. No. 851,879
21 Claims. (Cl. 64—11)

This invention relates generally to rubber torsional units for use in propeller drive shaft assemblies as well as in the rear axle housing on each side of the differential of motor vehicles, to absorb torsional vibration of the propeller shaft and to reduce noise transmitted by the gears of the transmission or differential into the vehicle body, and includes a method of making such rubber torsional units.

One of the objects of the invention is to overcome the objections to prior rubber torsional units wherein the rubber was not tight enough on the inner metal tube or sleeve, by reducing the thickness of the side walls of the rubber tube or sleeve from the inside thereof so that a tight grip on the inner metal tube or sleeve is obtained.

Another object is to provide a rubber torsional unit wherein the outside diameter of the rubber tube or sleeve in its free state is less than the inside diameter of the outer metal tube, so that there is a clearance of approximately 1/32" between the rubber sleeve and the outer metal tube before the inner metal tube is introduced. When the inner metal tube is moved lengthwise into the rubber sleeve, the drag of the rubber is eliminated, and such rubber will flow easier due to that clearance. Thus a better stress distribution in the walls of the rubber throughout its length will be obtained.

Another object is to provide an improved method of making a rubber torsional unit having the characteristics referred to above.

Other objects and features of the invention will become apparent as the description proceeds, especially when taken in conjunction with the accompanying drawing, illustrating preferred embodiments of the invention, wherein:

FIG. 1 is a longitudinal sectional view of a rubber torsional unit embodying my invention, shown in an intermediate stage of assembly;

FIG. 2 is a view similar to FIG. 1 showing the rubber torsional unit assembled;

FIG. 3 is a longitudinal sectional view of a rubber torsional unit having a modified construction, shown in an intermediate stage of assembly;

FIG. 4 is a fragmentary sectional view of the rubber torsional unit shown in FIG. 3 with the parts assembled.

FIG. 5 is a longitudinal sectional view of a rubber torsional unit having another modified construction, shown in an intermediate stage of assembly;

FIG. 6 is a view similar to FIG. 5 showing the rubber torsional unit assembled; and FIG. 7 is a sectional view taken on the line 7—7 of FIG. 6.

Although the rubber torsional units shown and described herein have general utility, they are particularly adapted for use in vehicle drive lines such, for example, as propeller drive shaft assemblies and the rear axle housing on each side of the differential.

Referring to FIGS. 1 and 2, the rubber torsional unit comprises a cylindrical outer rigid metal tube or sleeve 1, a cylindrical inner rigid metal tube or sleeve 2 and a cylindrical rubber tube or sleeve 3.

In the assembled condition of the unit shown in FIG. 2, the inner metal tube 2 is disposed within the outer metal tube 1 in coaxial relation therewith. The inner cylindrical surface 4 of outer metal tube 1 is of greater diameter than the outer cylindrical surface 5 of inner metal tube 2 to provide a cylindrical space between the metal tubes of the assembled unit.

The rubber tube or sleeve 3 is disposed in the space between the metal tubes and is turned outwardly at one end and return-bent to provide an annular lip 6 surrounding the end of the outer metal tube 1 and terminating in an enlarged bead 7. Except for the enlarged bead, the entire sleeve including its outwardly folded end and return-bent lip is of uniform thickness in the free state of the rubber. The bead 7 is of greater thickness. A steel band 8 encircles the lip 6 and compresses it on the tube 1 to frictionally secure the rubber sleeve 3 in position. In the free state of the rubber sleeve 3, its outside diameter is approximately 1/16" less than the inside diameter of outer metal tube 1 to provide a uniform annular clearance 9 of approximately 1/32" before insertion of the inner metal tube 2. In the free state of the rubber sleeve 3, its wall thickness is greater than the space between the metal tubes and its inside diameter is less than the outside diameter of the inner metal tube 2 so that the rubber sleeve is radially compressed between the tubes when the torsional unit is assembled.

The end of the inner metal tube 2 has its outer edge rounded to provide an annular nose 10 to reduce resistance during assembly when the inner tube is moved lengthwise into the rubber sleeve. The inner surface of the rubber sleeve 3 is flared at the end to provide an annular pilot 11 for the same purpose.

The parts of the rubber torsional unit are assembled by first securing the rubber sleeve 3 in the end of outer tube 1 as shown in FIG. 1, at which time a small annular clearance 9 of approximately 1/32" exists between sleeve 3 and tube 1. The inner metal tube 2 is then inserted lengthwise into the rubber sleeve 3 by moving it in the direction of the arrow. The annular rounded nose 10 on the end of tube 2 and the annular pilot 11 formed on the end of rubber sleeve 3 facilitate the insertion of the tube. Since the outside diameter of the inner metal tube 2 is greater than the inside diameter of the rubber sleeve 3, the sleeve will be expanded and compressed between the inner and outer metal tubes, taking up the clearance 9. If desired, the inner tube may be initially coated with a suitable lubricant to make insertion easier.

Since the inside diameter of rubber sleeve 3 in its free state is less than the outside diameter of inner tube 2, the inner surface of the sleeve is stretched and the sleeve is compressed between the tubes from the inside. Thus a tight frictional engagement between the rubber sleeve and metal tubes is obtained. It would be possible to compress the rubber sleeve by a reduction of its outside diameter rather than an enlargement of its inside diameter. However, the weakness of this procedure is that the rubber will not be tight enough on the inner metal tube where the area of contact is smallest. By reducing the rubber from the inside, according to my invention, a tight grip on the inner tube is obtained. The tight frictional engagement obtained between the rubber sleeve and both metal tubes prevents slip and is important in order that the unit may take torsional wind-up and absorb torsional vibration.

The slight clearance of approximately 1/32" provided between the rubber sleeve 3 and the outer metal tube 1 before the inner metal tube 2 is assembled is provided so that when the inner tube is inserted, the drag of the rubber is eliminated and such rubber will flow more readily. Thus there will be better stress distribution in the walls of the rubber sleeve throughout its length.

Referring now to FIGS. 3 and 4, a modification is illustrated in which the rubber torsional unit comprises a cylindrical outer rigid metal tube or sleeve 12, a cylindrical inner rigid metal tube or sleeve 13 and a cylindrical rubber tube or sleeve 14.

In the assembled condition of the unit shown in FIG. 4, the inner metal tube 13 is disposed within the outer metal tube 12 in coaxial relation therewith. The inner cylindrical surface 15 of the outer metal tube 12 is of greater diameter than the outer cylindrical surface 16 of the inner metal tube 13 to provide a cylindrical space between the metal tubes of the assembled unit.

The rubber tube or sleeve 14, in its free state, has an outside diameter which is approximately 1/16" less than the inside diameter of the outer metal tube 12 to provide a uniform clearance 17 of approximately 1/32" before insertion of the inner metal tube 13. In the free state of the rubber sleeve 14, its wall thickness is greater than the space between the metal tubes and its inside diameter is less than the outside diameter of the inner metal tube 13 so that the rubber sleeve is radially compressed between the tubes when the torsional unit is assembled.

The rubber sleeve 14 has an axial extension 18 at one end, the inner surface 19 of which is cylindrical and of substantially the same diameter as the outer cylindrical surface of inner tube 13. The cylindrical inner surface of sleeve extension 18 is curved at its inner end to merge with the cylindrical inner surface 20 of the sleeve. The outer end of the sleeve extension is folded outwardly and return-bent to define a groove or channel 21. The rubber sleeve 14 is formed to the desired shape in a mold and a metal band 22 is bonded to the rubber while the latter is being shaped in the mold. When the rubber is being cured or vulcanized under heat and pressure in the mold, a vulcanized bond is obtained with the metal band.

The end of the inner metal tube 13 has its outer edge rounded to provide an annular nose 23 to facilitate insertion into the rubber sleeve.

The parts of the rubber torsional unit shown in FIGS. 3 and 4 are assembled by first inserting the rubber sleeve 14 into the outer tube 12 in position with the exposed edge of metal band 22 abutting the outer end of the outer tube. As shown in FIG. 3, a small clearance 17 of approximately 1/32" exists between rubber sleeve 14 and outer metal tube 12. The inner metal tube 13 is then inserted lengthwise into the rubber sleeve by moving it in the direction of the arrow. The inner tube 13 first enters sleeve extension 18, and such movement is facilitated by the rounded nose 23 on the end of the inner tube and by the fact that the inside diameter of the sleeve extension is substantially the same as the outside diameter of the inner tube. The tube 13 will then move easily within the cylindrical surface 20 of the rubber sleeve because of the rounded nose 23 of the inner tube and the rounded surface connection between the inner surfaces 19 and 20 of the sleeve. Since the outside diameter of the inner tube 13 is greater than the inside diameter of the rubber sleeve 14, the sleeve will be expanded by the inner tube and compressed between the inner and outer tubes, taking up the clearance between the rubber sleeve and the outer tube. If desired, the inner tube may be initially coated with a suitable lubricant to make the insertion easier.

The rubber sleeve 14 is compressed by enlargement of its inside diameter, as in the first embodiment, to provide a tight frictional engagement of the rubber with both inner and outer metal tubes.

When the inner metal tube is moved lengthwise into the rubber sleeve, the drag of the rubber is eliminated and the rubber will flow easier due to the clearance 17.

Referring to FIGS. 5–7, a further modification is illustrated which is similar to the construction shown in FIGS. 1 and 2. The modified rubber torsional unit of FIGS. 5–7 comprises a cylindrical outer rigid metal tube or sleeve 25, a cylindrical inner rigid metal tube or sleeve 26 and a cylindrical rubber tube or sleeve 27.

In the assembled condition of the unit, shown in FIGS. 6 and 7, the inner metal tube 26 is disposed within the outer metal tube 25 in coaxial relation therewith. The inner cylindrical surface 28 of the outer metal tube 25 is of greater diameter than the outer cylindrical surface 29 of the inner metal tube 26 to provide a cylindrical space between the metal tubes of the assembled unit.

The rubber tube or sleeve 27 is disposed in the space between the metal tubes and is turned outwardly at one end and return-bent, thus providing an outwardly folded end 30 and an annular lip 31. The outwardly folded portion 30 extends across the end of the tube 25 and the annular lip 31 surrounds the end of tube 25. A transversely split steel band 32 encircles the lip 31 and compresses it on the tube 25 to frictionally secure the rubber sleeve 27 in position. The split ends of the band 32 are turned outwardly to form ears 33 clamped together by the nut and bolt assembly 34 to produce a tight grip on the lip.

In order to provide a very firm grip between the lip and the outer tube 25, the outer tube is formed with a series of longitudinally spaced circumferentially extending grooves 35 in its outer surface adjacent one end and the clamping pressure of the split band 32 is enough to sink the rubber of the lip into the grooves. The clamping tension of band 32 may be increased by tightening the nut and bolt assembly 34. The sleeve 27 in the space between the metal tubes is of uniform thickness throughout its length, and outwardly folded end 30 and return-bent lip 31 thereof are of greater thickness, in the free state of the rubber.

In the free state of the rubber sleeve 27, its outside diameter is approximately 1/16" less than the inside diameter of outer metal tube 25 to provide a uniform annular clearance 36 of approximately 1/32" before insertion of the inner metal tube 26. In the free state of the rubber sleeve 27, its wall thickness is greater than the space between the metal tubes and its inside diameter is less than the outside diameter of the inner metal tube 26 so that the rubber sleeve is radially compressed between the tubes when the torsional unit is assembled.

The end of the inner metal tube 26 has its outer edge beveled to provide an annular tapered nose 37 to reduce resistance during assembly when the inner tube is moved lengthwise into the rubber sleeve. The inner surface of the rubber sleeve 27 is flared at the end to provide an annular pilot 38 for the same purpose.

The parts of the rubber torsional unit are assembled in the same manner as were the parts of the rubber torsional unit shown in FIGS. 1 and 2. The adjustable split clamping band, the grooves 35 in the outer tube and the increased thickness of the outwardly folded end 30 and return-bent lip 31 are provided so that the rubber forming the end 30 of the sleeve does not neck down and is not pulled inside the space between the metal tubes during the lengthwise insertion of the inner tube. Both the increased thickness of the rubber and the increased holding action provided by the split clamp and grooved outer tube assure that the rubber is held firmly in place. While the construction of FIGS. 1 and 2 may be suitable in certain applications, nevertheless the added provisions embodied in the construction of FIGS. 5–7 are desirable where there is a tendency for the rubber at the end of the sleeve to neck down and enter the gap between the tubes during assembly.

The rubber torsional units described are of the non-bonded type, and in each instance the rubber tube or sleeve is reduced from the inside so that a tight grip on the inner tube is obtained, thus overcoming the objections to prior rubber torsional units of this type.

What I claim as my invention is:

1. A torsional unit comprising a rigid outer tube, a rigid inner tube coaxially within said outer tube and cooperating therewith to provide an annular space, and a sleeve of rubber extending lengthwise of said annular space and under compression therein between said inner and outer tubes, said sleeve in its free state having an inside diameter less than the outside diameter of said inner tube, whereby the thickness of the side walls of said sleeve is reduced from the inside thereof when under compression as aforesaid, said sleeve in its free state having an outside diameter less than the inside diameter of said outer tube to obtain better stress distribution in said sleeve when under compression as aforesaid, the end of said sleeve being folded outwardly across the corresponding end of said outer tube and return-bent to provide a lip surrounding said end of said outer tube, and a band encircling said lip and clamping it tightly to said outer tube.

2. A torsional unit as in claim 1 in which the inner surface of said sleeve at its return-bent end is flared and an end of said inner tube is rounded to cooperate with the flared end of said sleeve in facilitating the endwise insertion of said inner tube into said sleeve during assembly of the unit.

3. A torsional unit comprising a rigid outer tube, a rigid inner tube coaxially within said outer tube and cooperating therewith to provide an annular space, and a sleeve of rubber extending lengthwise of said annular space and under compression therein between said inner and outer tubes, said sleeve in its free state having an inside diameter less than the outside diameter of said inner tube, whereby the thickness of the side walls of said sleeve is reduced from the inside thereof when under compression as aforesaid, said sleeve in its free state having an outside diameter less than the inside diameter of said outer tube to obtain better stress distribution in said sleeve when under compression as aforesaid, said sleeve having at said one end a cylindrical extension the inside diameter of which is approximately the same as the outside diameter of said inner tube to facilitate the endwise insertion of said inner tube into said sleeve, the end of said cylindrical extension being folded outwardly and return-bent to form a channel, and a metal reinforcing band secured in said channel by a vulcanized bond.

4. A torsional unit comprising a rigid outer tube, a rigid inner tube coaxially within said outer tube and cooperating therewith to provide an annular space, and a sleeve of rubber extending lengthwise of said annular space and under compression therein between said inner and outer tubes, said sleeve in its free state having an inside diameter less than the outside diameter of said inner tube, whereby the thickness of the side walls of said sleeve is reduced from the inside thereof when under compression as aforesaid, said sleeve in its free state having an outside diameter less than the inside diameter of said outer tube to obtain better stress distribution in said sleeve when under compression as aforesaid, the end of said sleeve being folded outwardly across the corresponding end of said outer tube and return-bent to provide a lip surrounding said end of said outer tube, said sleeve in said space and the outwardly folded end and return-bent lip thereof being of the same thickness in the free state of the rubber, and a band encircling said lip and clamping it tightly to said outer tube.

5. A torsional unit comprising a rigid outer tube, a rigid inner tube coaxially within said outer tube and cooperating therewith to provide an annular space, and a sleeve of rubber extending lengthwise of said annular space and under compression therein between said inner and outer tubes, said sleeve in its free state having an inside diameter less than the outside diameter of said inner tube, whereby the thickness of the side walls of said sleeve is reduced from the inside thereof when under compression as aforesaid, said sleeve in its free state having an outside diameter less than the inside diameter of said outer tube to obtain better stress distribution in said sleeve when under compression as aforesaid, the end of said sleeve being folded outwardly across the corresponding end of said outer tube and return-bent to provide a lip surrounding said end of said outer tube, said sleeve in said space being of uniform thickness and the outwardly folded end and the return-bent lip thereof being of greater thickness in the free state of the rubber, and a band encircling said lip and clamping it tightly to said outer tube.

6. A torsional unit as in claim 5, in which the end of said outer tube surrounded by said lip is formed in its outer surface with longitudinally spaced circumferentially extending grooves, said band is transversely split, and adjustable clamping means are provided to connect the split ends of said band and adjustably tension said band, thereby to sink the rubber of said lip into said grooves.

7. A torsional unit comprising a rigid outer tube, a rigid inner tube coaxially within said outer tube and cooperating therewith to provide an annular space, and a sleeve of rubber extending lengthwise of said annular space and under compression therein between said inner and outer tubes, said sleeve in its free state having an inside diameter less than the outside diameter of said inner tube, whereby the thickness of the side walls of said sleeve is reduced from the inside thereof when under compression as aforesaid, said sleeve in its free state having an outside diameter less than the inside diameter of said outer tube to obtain better stress distribution in said sleeve when under compression as aforesaid, the end of said sleeve being folded outwardly across the corresponding end of said outer tube and return-bent to provide a lip surrounding said end of said outer tube, a band encircling said lip and clamping it tightly to said outer tube, said end of said outer tube being formed with external longitudinally spaced, circumferentially extending grooves, said band being transversely split, and adjustable clamping means connecting the split ends of said band to adjustably tension said bend and thereby sink the rubber of said lip into said grooves.

8. A torsional unit comprising a rigid outer tubular member, a rigid inner member coaxially within said outer member and cooperating therewith to provide an annular space, and a sleeve of resilient material extending lengthwise of said annular space and under compression therein between said inner and outer members, said sleeve in its free state having an inside diameter less than the outside diameter of said inner member, whereby the thickness of the side walls of said sleeve is reduced from the inside thereof when under compression as aforesaid, the end of said sleeve being folded outwardly across the corresponding end of said outer member and return-bent to provide a lip surrounding said end of said outer member, and a clamp extending about said lip and clamping it tightly to said outer member.

9. A torsional unit comprising a rigid outer tubular member, a rigid inner member coaxially within said outer member and cooperating therewith to provide an annular space, and a sleeve of resilient material extending lengthwise of said annular space and under compression therein between said inner and outer members, the end of said sleeve being folded outwardly across the corresponding end of said outer member and return-bent to provide a lip surrounding said end of said outer member, and a clamp extending about said lip and clamping it tightly to said outer member.

10. The torsional unit defined in 9 wherein said sleeve in said space is of uniform wall thickness and the outwardly folded end and return-bent lip thereof are of greater thickness in the free state of the resilient material.

11. The torsional unit defined in claim 9 wherein the end of said outer member surrounded by said lip is formed in its outer surface with longitudinally spaced circumferentially extending grooves, and the material of said lip is sunk into said grooves by the pressure of said clamp.

12. A torsional unit comprising a rigid outer tubular member, a rigid inner member coaxially within said outer member and cooperating therewith to provide an annular space, and a sleeve of resilient material extending lengthwise of said annular space and under compression therein between said inner and outer members, the end of said sleeve being folded outwardly across the corresponding end of said outer member and return-bent to provide a lip surrounding said end of said outer member.

13. The torsional unit defined in claim 12 wherein said sleeve in said space is of uniform wall thickness and the outwardly folded end and return-bent lip thereof are of greater thickness in the free state of the resilient material.

14. A torsional unit comprising a rigid outer tubular member, a rigid inner member coaxially within said outer member and cooperating therewith to provide an annular space, and a sleeve of resilient material extending lengthwise of said annular space and under compression therein between said inner and outer members, said sleeve in its free state having an inside diameter less than the outside diameter of said inner member, whereby the thickness of the side walls of said sleeve is reduced from the inside thereof when under compression as aforesaid, said sleeve having at one end a cylindrical extension beyond one end of said outer member the inside diameter of which is approximately the same as the outside diameter of said inner member to facilitate the endwise insertion of said inner member into said sleeve, the end of said cylindrical extension being folded outwardly and return-bent to form a channel, and a reinforcing band secured in said channel.

15. The torsional unit defined in claim 14 in which said reinforcing band is in abutting engagement with said one end of said outer member.

16. A torsional unit comprising a rigid outer tubular member, a rigid inner member coaxially within said outer member and cooperating therewith to provide an annular space, and a sleeve of resilient material extending lengthwise of said annular space and under compression therein between said inner and outer members, said sleeve having at one end a cylindrical extension beyond one end of said outer member the inside diameter of which is approximately the same as the outside diameter of said inner member to facilitate the endwise insertion of said inner member into said sleeve, the end of said cylindrical extension being folded outwardly and return-bent to form a channel, and a reinforcing band secured in said channel.

17. A torsional unit comprising a rigid outer tubular member, a rigid inner member coaxially within said outer member and cooperating therewith to provide an annular space, and a sleeve of resilient material extending lengthwise of said annular space and under compression therein between said inner and outer members, said sleeve having at one end a cylindrical extension beyond one end of said outer member, and a band secured to said cylindrical extension and abutting said one end of said outer member.

18. A torsional unit comprising a rigid outer tubular member, a rigid inner member coaxially within said outer member and cooperating therewith to provide an annular space, and a sleeve of resilient material extending lengthwise of said annular space and under compression therein between said inner and outer members, said sleeve having at one end a cylindrical extension beyond one end of said outer member, and a reinforcing band secured to said cylindrical extension.

19. A torsional unit comprising a rigid outer tubular member, a rigid inner member coaxially within said outer member and cooperating therewith to provide an annular space, and a sleeve of resilient material extending lengthwise of said annular space and under compression therein between said inner and outer members, said sleeve in its free state having an inside diameter less than the outside diameter of said inner member, whereby the thickness of the side walls of said sleeve is reduced from the inside thereof when under compression as aforesaid, said sleeve having at one end a cylindrical extension beyond one end of said outer member the inside diameter of which is approximately the same as the outside diameter of said inner member to facilitate the endwise insertion of said inner member into said sleeve.

20. The torsional unit defined in claim 19 wherein a reinforcing band is secured to said cylindrical extension in concentric relation to and radially outwardly of the inner surface of said cylindrical extension.

21. A torsional unit comprising an outer tubular member, an inner member within said outer member and cooperating therewith to provide an annular space, and a sleeve of resilient material extending lengthwise of said annular space and under compression between said inner and outer members, the entire length of said sleeve under compression between said inner and outer members, in the free state of said sleeve, being of uniform inside and outside diameter and of uniform wall thickness greater than the width of said space so as to be uniformly compressed from end to end, the inside diameter aforesaid of said sleeve in its free state being less than the outside diameter of said inner member, whereby the side walls of said sleeve are reduced in thickness from the inside thereof when under compression, the outside diameter aforesaid of said sleeve in its free state being less than the inside diameter of said outer member to obtain better stress distribution in said sleeve when under compression, the said sleeve having at one end a cylindrical extension beyond one end of said outer member, the inside diameter of said cylindrical extension being approximately the same as the outside diameter of said inner member to facilitate the endwise insertion of said inner member within said sleeve.

References Cited in the file of this patent

UNITED STATES PATENTS

| | | |
|---|---|---|
| 2,290,011 | Bahr | July 14, 1942 |
| 2,468,985 | Krotz | May 3, 1949 |
| 2,476,894 | Mulheim | July 19, 1949 |
| 2,558,589 | Skofield | June 26, 1951 |
| 2,763,055 | Hardy | Sept. 18, 1956 |
| 2,772,104 | Thiry | Nov. 27, 1957 |
| 2,823,054 | Thiry | Feb. 11, 1958 |